United States Patent [19]
Fagan

[11] 3,909,525
[45] Sept. 30, 1975

[54] DISPLAY SYSTEM OPTICS

[75] Inventor: James R. Fagan, Columbus, Ohio

[73] Assignee: Rockwell International Corporation, Pittsburgh, Pa.

[22] Filed: Dec. 10, 1973

[21] Appl. No.: 423,629

[52] U.S. Cl. ............................ 178/7.85; 353/30
[51] Int. Cl.² .................................... H01J 29/89
[58] Field of Search....... 178/7.85, DIG. 1, DIG. 23, 178/7.5 D, DIG. 20, 6.8; 350/211; 352/70; 353/30, 31, 38

[56] References Cited
UNITED STATES PATENTS

| | | | |
|---|---|---|---|
| 2,513,176 | 6/1950 | Homrighous | 178/7.85 |
| 2,706,930 | 4/1955 | Jansen | 350/211 |
| 3,004,099 | 10/1961 | Harries | 178/7.85 |
| 3,071,706 | 1/1963 | Waldorf | 178/DIG. 23 |
| 3,273,260 | 9/1966 | Walker | 178/DIG. 23 |
| 3,525,807 | 8/1970 | Herriott | 178/7.85 |
| 3,580,978 | 5/1971 | Ebeling | 353/30 |
| 3,697,681 | 10/1972 | McCoy | 178/6.8 |

*Primary Examiner*—Howard W. Britton
*Assistant Examiner*—Michael A. Masinick

[57] ABSTRACT

An array of laterally-abutted Fresnel magnifying lenses in combination with an aligned array of image generators having particular spaced-apart objective images derived from an original image, displays such objective images for viewing as a unitary magnified original image without noticeable overlap or distortion throughout an appreciable theater space.

4 Claims, 7 Drawing Figures

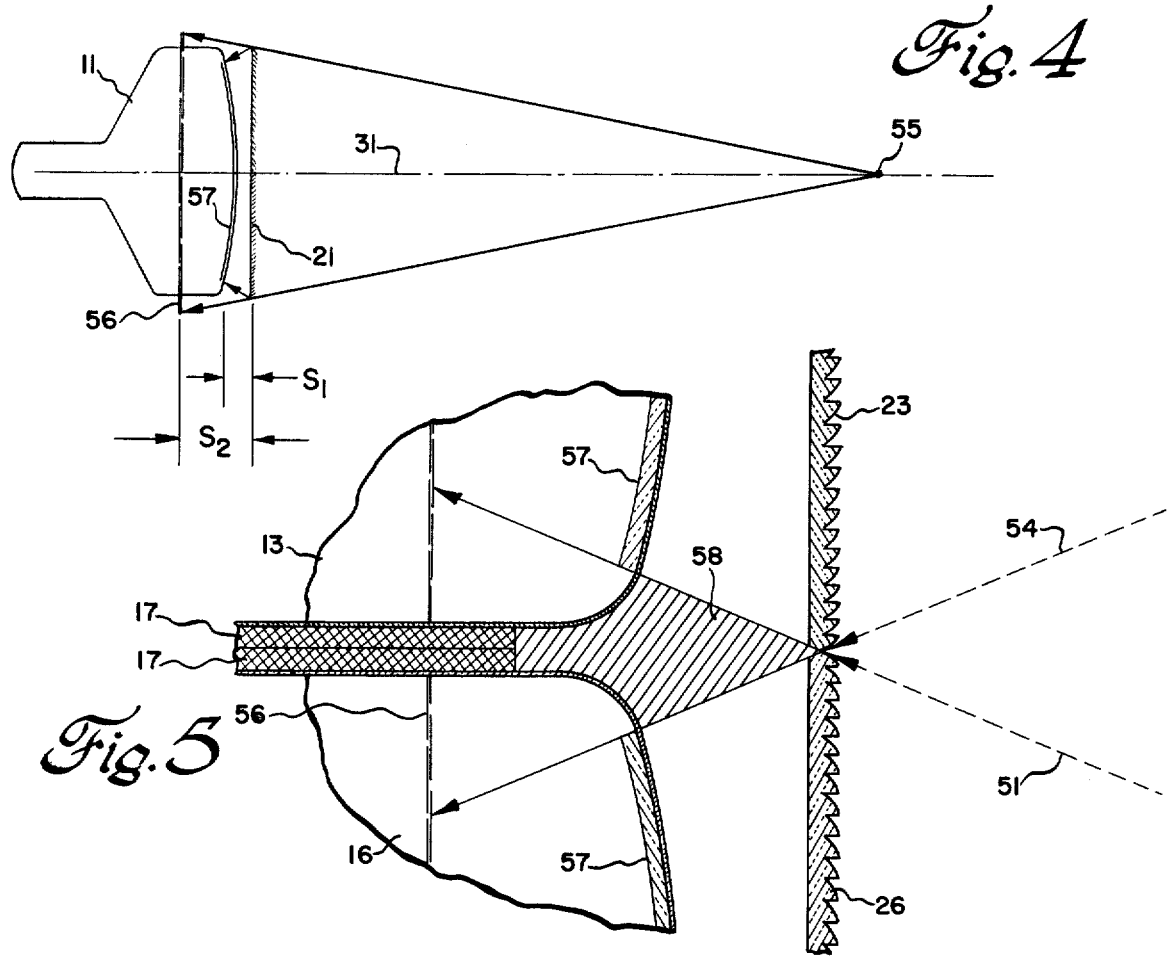
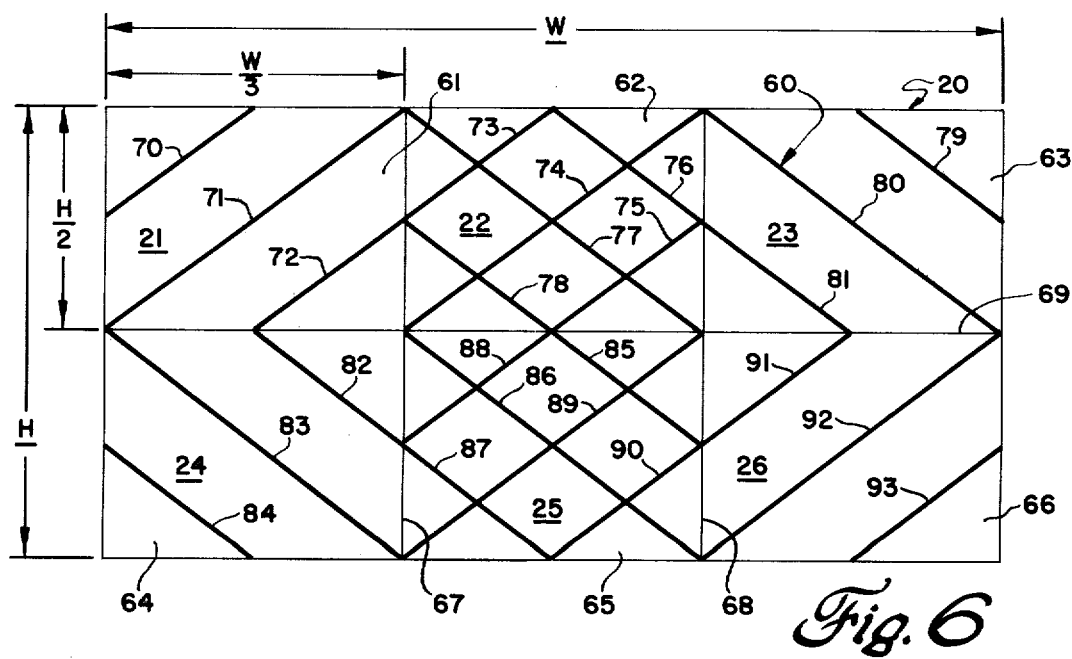

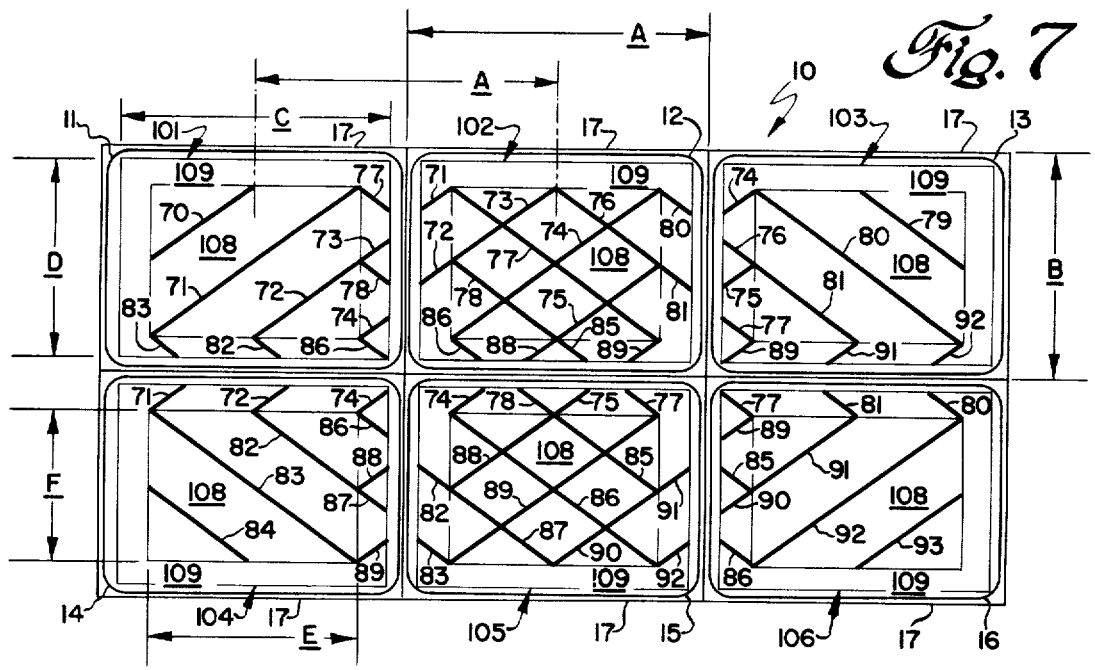

DISPLAY SYSTEM OPTICS

SUMMARY OF THE INVENTION

The present invention utilizes basic input information which at least ultimately must have a viewable image form. Typically such basic input information has an original image form for display by known image generator devices such as cathode ray tubes, plasma generators, light-emitting diodes, liquid crystal devices, or the like in a properly arrayed relationship. Each image generator device displays a separate objective image module basically comprised of a prescribed module unique portion in combination with one or more contiguous module parallax compensation portions. Both such objective image module portions most often have a degree of included size magnification usually obtained by known electronic amplification techniques. The image modules or elements displayed as separated objective images in an array are magnified by an aligned array of laterally-abutted Fresnel lenses and the resulting virtual image is presented for viewing as a unitary and substantially magnified version of the total original image. The objective image array and Fresnel lens array may be optionally provided with plan curvature to provide for an increased theater space wherein the unitary magnified image may be viewed throughout a wide range of lateral positions also without the ready detection of overlapping parallax compensation portions provided in the objective image modules. A vertical theater space of substantial magnitude may be developed advantageously by vertically offsetting the optical center of the objective image module and cooperating lens thereby eliminating the necessity of providing elevational array curvature.

DESCRIPTION OF THE DRAWINGS

FIG. 4 is an elevational view of one portion of the FIG. 1 display apparatus;

FIG. 5 is an enlarged fragmentary sectional view taken in the range of adjoining optical elements;

FIG. 6 is an elevational view of a unitary magnified original image displayed by the lens array of the present invention; and FIG. 7 is an elevational view of the array of spaced-apart reconstructed original images with original image portions and added parallax compensation portions viewed as objective images by the apparatus of FIGS. 1 through 5 and forming the display of FIG. 6.

DETAILED DESCRIPTION

Figure 1:
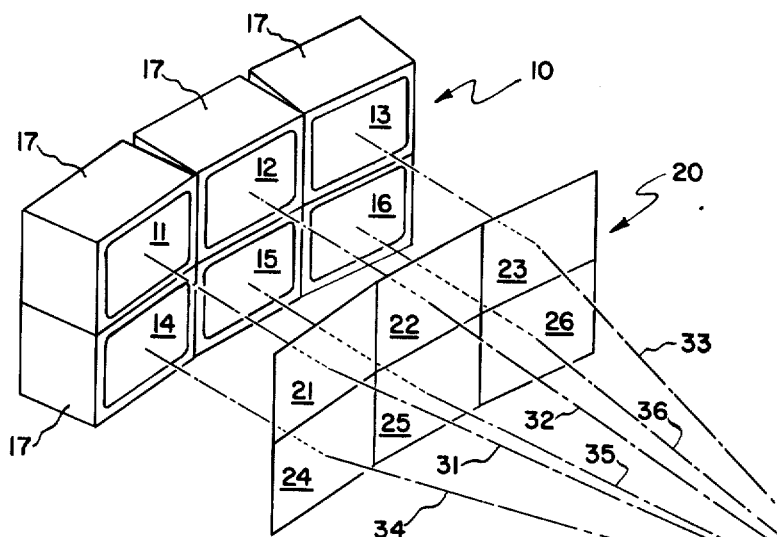
FIG. 1 is an exploded perspective view of the optical apparatus employed in the practice of the instant invention.

FIG. 1 illustrates a preferred embodiment of the present invention in exploded relation and such embodiment is basically comprised of display generator array 10 and magnifying lens array 20. Array 10 is comprised of conventional cathode ray tubes 11 through 16 in the FIG. 1 illustration although in other embodiments of the invention the modular devices of array 10 may comprise conventional plasma generator displays, light-emitting diode displays, liquid crystal displays, or other size-limited devices. Array 20 is aligned optically with array 10 on a module to module basis and is comprised of laterally-abutted Fresnel lenses 21 through 26. Each such lens might be replaced by a functionally equivalent refractive magnifying lens but weight, cost, and certain optical performance advantages can be realized by using a type of Fresnel lens molded from various optically transparent organic resin systems.

Each display generator module in array 10 is basically size-limited by structural or operating connection considerations. Also, each such module is further normally contained within a housing 17 that accomplishes a desired support function. Although the devices of arrays 10 and 20 in FIGS. 1 through 3 are optically aligned in a manner whereby the different optical alignment axes 31 through 36 for each display generator-lens combination are made to converge both in plan and in elevation at the single point designated 30, in most cases involving arrays with a greater number of modules in horizontal and vertical directions improved extent of theater space is obtained if each pair of modules symmetrically positioned with respect to the array centerline are oriented to have their optical axes converge at a point a different distance from the lenses along such display centerline than the point of convergence of the most adjacent symmetrically positioned module pair.

Figure 2:
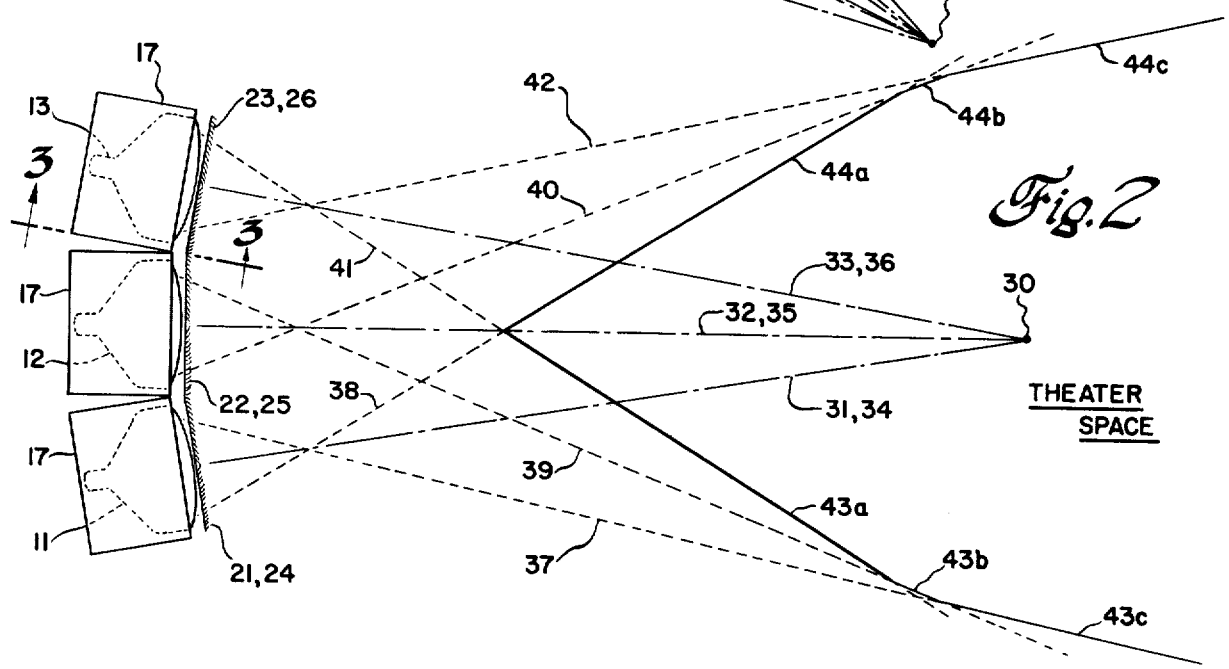
FIG. 2 is a plan view of the FIG. 1 apparatus illustrating the lateral theater space that is obtained.

FIG. 2 is a plan view of the aligned arrays of FIG. 1 in their non-exploded relation showing optical axes 31 through 36 in plan in their true total straight line character. Limits of the individual modular optical system viewing space and acceptance angles are designated 37 through 42 and certain of their extensions define the theater space plan limits in heavied lines for the combined arrays, such limits being defined by the solid line portions designated 43a–c and 44a–c. With the array plan curvature shown, an observer positioned at any location within the theater space boundary may observe the magnified and unified display on the face of Fresnel lenses 21 through 26 without detecting any overlap of the hereinafter described parallax compensation image portions provided in the different image modules displayed by the display generator devices of array 10.

Figure 3:
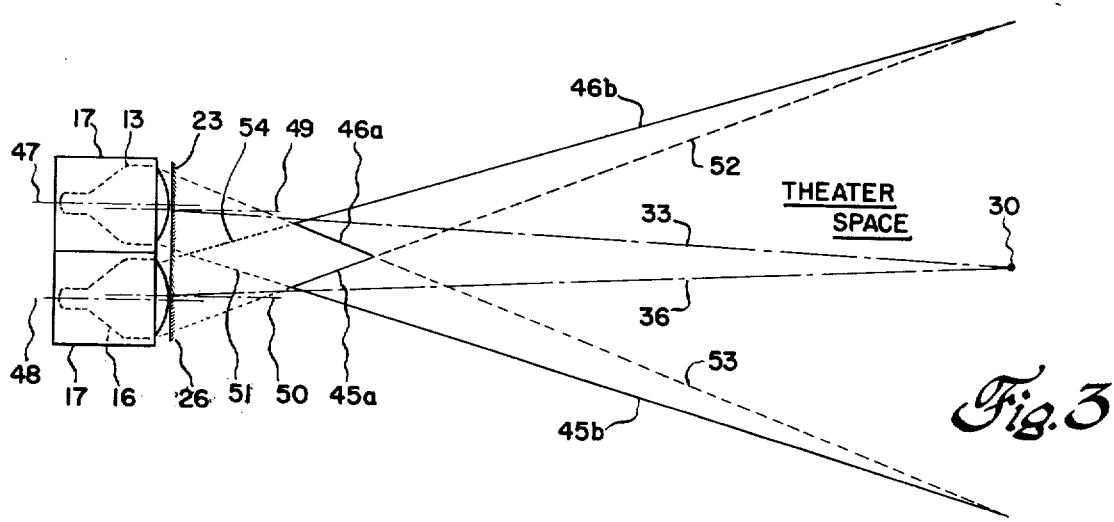
FIG. 3 is an elevational view of the FIG. 1 apparatus taken at line 3—3 of FIG. 2 and illustrating the vertical theater space that is obtained.

FIG. 3 is similar to FIG. 2 except that details are illustrated with respect to the vertical theater space that is obtained in combined arrays 10 and 20 without providing for elevational curvature. To simplify elevational construction of such optical apparatus, the vertical separation between the optical centers of the images displayed by generators 13 and 16 is adjusted so that the horizontal optical axes 47 and 48 of elements 13 and 16 are each vertically offset with respect to the horizontal optical axes 49 and 50 of lenses 23 and 26. However, axes 33 and 36 (FIG. 3) connect such optical centers and are arranged to converge at point 30. The obtained theater space is defined by the limit line portions designated 45a–b and 46a–b and has a general shape of W configuration. Lines 51 through 54 are the limits of the modular optical system vertical viewing space and acceptance angles for optical components 13, 16, 23, and 26.

FIG. 4 illustrates the optical magnification relationship which exists between arrays 10 and 20 for a representative pairing of a modular display generator devide (11) and a modular magnifying Fresnel lens (21) combination. The distance $S_1$ that is illustrated is the object distance of the optical system and essentially is the distance from the plane of Fresnel lens 21 to the plane of the display image on the face of cathode ray tube 11. The distance $S_2$ is the image distance from the plane of Fresnel lens 21 to the magnified image developed by such lens. By conventional definition, and since the distance $S_2$ has a negative value in the FIG. 4 optics system, the enlarged image as viewed from point 55 for instance is at the plane designated 56 and is a virtual image. The degree of magnification (M) obtained in the FIG. 4 optics arrangement is conventionally expressed as the ratio of the absolute values of $S_2$ to $S_1$. Also by definition the inverse of the focal length $f_L$ of the FIG. 4 optical arrangement is $1/S_1 + 1/S_2$. Further by definition, the $f$ number of the FIG. 4 optics arrangement is $f_N$ and is equal to $f_L/D$, where $D$ is the lens diameter. Since in most applications of this invention Fresnel lens 21 is of elongated rectangular configuration the dimensional of the lens included diagonal is considered to be the lens diameter $D$. Also it should be noted that the type of display device illustrated in FIGS. 2 through 4 (cathode ray tube) has a spherical display surface. It therefore becomes desirable that Fresnel lens 21 be constructed as an aspherical magnifying device to thus compensate for optical aberrations and distortions that otherwise would occur.

An important point to be noted with respect to FIG. 4 is that the limits of the virtual image in plane 56 extends substantially beyond the limits of the image display area 57 on the face of device 11 and of cathode ray tube 11. A region or zone is thereby made available for installing support structure for device 11 without interfering with formation of the magnified virtual image. FIG. 5 illustrates schematically and in greater detail the method of installing vertically abutting supports or housings 17 for devices 13 and 16 of FIG. 3 within the available support space. The zone 58 illustrated in FIG. 5 and shaded by appropriate diagonal lines may also be used for support or allied purposes since the presence of structure there will not interfere with the virtual images appearing at aligned plane 56. The same support technique may be used in connection with the lateral (horizontal) separation of objective image modules that occurs in the arrangement of display modules in array 10.

FIGS. 6 and 7 are provided in the drawings to illustrate the form relationships that exist as between the images displayed on arrays 10 and 20 in accordance with this invention. FIG. 6 illustrates a total image 60 as viewed on magnifying lens array 20 from positions within the FIG. 2 and FIG. 3 theater spaces. Total image 60 is comprised of individual image modules 61 through 66 abutted along lines 67 through 69. Lines 67 and 68 are the lines of vertical abutment between Fresnel lenses 21 through 26 and line 69 is the line of horizontal abutment of lenses in array 20. The diagonal line elements 70 through 93 comprise total image 60. Those individual line elements comprising each one of separate image modules 61 through 66 are separately numbered for the different lenses shown in FIG. 6. The actual width dimension of total image 60 as optically magnified and viewed is designated $W$ and the over-all height dimension of the array of optically magnified image modules 61 through 66 is designated $H$. Since arrays 10 and 20 are preferably comprised of modules of uniform size, and since the illustrated FIG. 6 array 20 is comprised of three image/lens modules in a horizontal direction and two image/lens modules in an elevational sense, each individual lens module in array 20 has a width dimension of $W/3$ and a height dimension of $H/2$.

FIG. 7 is similar to FIG. 6 but is an elevational view of image generator device array 10 as observed from between arrays 10 and 20. The support element and cathode ray tube element portions of array 10 have the same reference numerals 11 through 17 as in FIG. 1. However, the objective images which are displayed on array 10 are separately designated 101 through 106, respectively, and each essentially corresponds in extent to the cathode ray tube image display area 57 limits of FIG. 5. Each such objective image is comprised of an interior unique area designated 108 and a surrounding parallax compensation or overlap area 109. The unique area 108 and surrounding parallax compensation or overlap area 109 comprise the total area of each displayed objective image module.

The interior unique area portion 108 of each objective image contains the original image diagonal line elements of the optically aligned image module in FIG. 6 in their form and size prior to optical magnification by an appropriate one of Fresnel lens 21 through 26. The surrounding overlap 109 contains duplicate or overlap portions of the original image diagonal line elements in each adjacent or abutting image module. FIG. 7 also provides dimensional information regarding the invention beyond that disclosed in FIG. 6. As shown, each module in image generator array 10 has an over-all width dimension of $A$ and an over-all height dimension of $B$. Such $A$ and $B$ dimensions correspond to the modular dimensions $W/3$ and $H/2$ illustrated in FIG. 6, respectively, and also define the over-all width and height dimensions of each typical support or housing 17. Further, the dimension $A$ corresponds to the horizontal center-to-center distance between adjacent objective image modules displayed in array 10.

Schematically outlined cathode ray tubes 11 through 16 of FIG. 7 are normally of standard construction in all respects. The illustrated FIG. 7 dimensions $C$ and $D$ for each such image generator are the over-all dimensions for each included image module 101, 102, etc. Dimension $C$ is normally approximately 0.9 dimension $A$. The dimension $D$ in a conventional cathode ray tube display is normally approximately 0.7 the value of dimension $A$. With respect to the image unique area provided in each image module, dimensions $E$ and $F$ are typically 0.7 and 0.5 the value of dimension $A$, respectively. Accordingly, the width of the parallax compensation margin or overlap area 109 which surrounds each image unique area 108 is normally 0.1 the value of dimension $A$.

Although the foregoing objective image module dimensional information pertaining to unique areas and overlap areas is expressed in relation to a finite dimension such as the width of the magnified original image displayed in area 20 ($A$, $W/n$, a technical analysis and derivation for such dimensional information does exist. Specifically, the total image overlap, in percent, for both sides of an image module (the percentage ratio of the dimension $C$ minus dimension $E$ divided by dimension $C$, or dimension $D$ less dimension $F$ divided by dimension $D$, FIG. 7) equals -Continued $$\frac{2f_N(1-M)\tan\frac{\alpha}{2}}{d} \times 100$$

where $f_N$ is the $f$ number for the Fresnel lens, where $M$ equals the obtained degree of optical magnification, where $\alpha$ is the optical system cone angle, i.e., the horizontal cone included angle throughout which the viewer expects to see the displayed magnified image, and where $d$ is the objective image size which in the case of a cathode ray tube display is defined by the total usable diagonal dimension.

We claim:

1. In a magnified image display system, in combination:
   an array of magnifying Fresnel lenses, each Fresnel lens in said array of Fresnel lenses laterally abutting an adjacent Fresnel lens and having an optical center,
   an array of image generators, each image generator in said array of image generators having an optical center aligned with a different one of said Fresnel lens optical centers along an associated viewing axis and having an image display area spaced-apart from the display area of an adjacent image generator in said array of image generators, and
   an array of spaced-apart image modules displayed at said image generator image display areas, each image module in said array of image modules having a unique image area and an overlap image area joining said unique image area,
   each said image module overlap image area duplicating image details of the unique image area displayed most adjacent thereto at another of said image modules.

2. The system defined by claim 1 wherein each said Fresnel lens presents a virtual image at a magnification of $M$ relative to its associated image generator display area, has an $f$ number $f_N$, and has a cone angle $\alpha$ relative to viewing acceptance along its associated viewing axis, and wherein each said displayed image module display area has an effective diameter $d$, said displayed image module overlap area having a ratio of lateral extent relative to the lateral extent of said displayed image module unique area in the amount of:

$$\frac{2f_N(1-M)\tan\frac{\alpha}{2}}{d}.$$

3. The system defined by claim 1 wherein said image generators are television cathode ray tubes, and wherein each displayed image module has a lateral extent and an elevational extent, said image module lateral and elevational extents corresponding respectively to the unblanked horizontal and vertical sweep extents of the electron beam of said television cathode ray tubes.

4. The invention defined by claim 1 wherein one abutting pair of Fresnel lenses in said array of magnifying Fresnel lenses and an associated pair of image generator display areas in said array of image generators are arranged in parallel lateral planes free of curvature, the optical centers of said pair of Fresnel lenses being laterally offset laterally inwardly with respect to the optical centers of said pair of image generator display areas whereby the viewing axes associated with said pairs pass through said offset optical centers oblique to said parallel lateral planes and converge at a viewing point.

* * * * *